W. J. MOELLER.
INSULATOR COVERING.
APPLICATION FILED JUNE 6, 1910.

1,020,567.

Patented Mar. 19, 1912.

Witnesses

Inventor
William J. Moeller
By James N. Ramsey
Attorney

UNITED STATES PATENT OFFICE.

WILLIAM J. MOELLER, OF WYOMING, OHIO, ASSIGNOR TO THE PHILIP CAREY MANUFACTURING COMPANY, OF LOCKLAND, OHIO, A CORPORATION OF OHIO.

INSULATOR-COVERING.

1,020,567.  Specification of Letters Patent.  Patented Mar. 19, 1912.

Application filed June 6, 1910. Serial No. 565,322.

*To all whom it may concern:*

Be it known that I, WILLIAM J. MOELLER, a citizen of the United States, residing at Wyoming, in the county of Hamilton and State of Ohio, have invented certain new and useful Improvements in Insulator-Coverings, of which the following is a specification.

My invention relates to insulating covering for pipes and linings.

The object of my invention is to provide efficient insulating coverings for pipes and for lining receptacles such as cooling cars to be filled with fruits, etc.

My invention consists of an article of manufacture comprising an outer layer of water proof sheet felt, a layer of corrugated asbestos adjacent thereto and producing air cells therebetween, next a layer of heavy woolen felt, next a layer of corrugated asbestos disposed transversely to the first mentioned sheet of asbestos producing air cells between the layer of woolen felt and the corrugated asbestos, additional sheets as desired of woolen felt and corrugated asbestos, and another outer sheet of water proof felt, the outer layers of water proof sheet felt and the outer edges of the several layers being coated with a suitable mixture of water proof material.

My invention also consists in the several features of novelty set forth and claimed.

Figure 1:
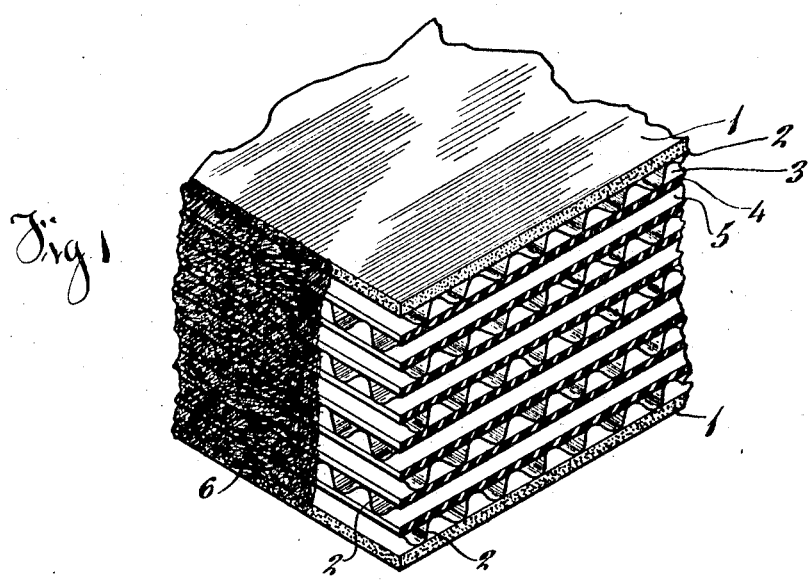
Figure 2:
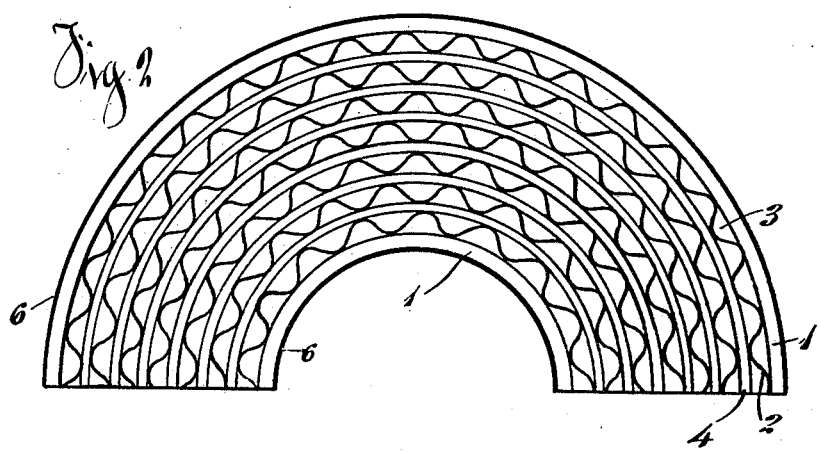

In the drawing: Figure 1 is a perspective view showing a portion of my insulator in flat or board form. Fig. 2 is an end view showing the invention applicable as a pipe covering.

In the construction of my asbestos coverings as illustrated, an outer layer of water proof felt 1 is provided. Next a layer of corrugated asbestos 2 is placed adjacent thereto, producing a series of air cells 3 between said parts 1 and 2. Next a sheet of heavy woolen felt 4 is superposed thereon. Then a layer of corrugated asbestos 5, having corrugations extending transversely to the corrugations of layer 2 is superposed thereon. Then additional layers of felt and asbestos may be placed thereon alternating the direction of the corrugations to produce air cells 3 extending in different directions through said insulator. The several layers are secured together by an adhesive mixture. The number of layers of material can be varied indefinitely to form an insulator of such thickness as may be desired, the outer layers both being of water proof felt 1. This insulator may be formed flat to provide linings for flat surfaces, as shown in Fig. 1, or it may be formed circular to cover pipes, as shown in Fig. 2, or may be made in any shape desired for the purpose intended. The insulator constructed in accordance with my invention being provided with numerous air cells produces a thoroughly efficient non-conductor of heat.

I prefer to place the corrugated layers of asbestos 5 in such maner that the corrugations of each layer will extend transversely to the corrugations of the adjacent layer to produce additional strength. The water proof sheet felt 1 is preferably made of woolen felt saturated with water proof material. The entire surface of the insulator is preferably covered with a water proof asphalt compound as shown at 6.

My improved insulators are light, durable, efficient and economical to construct.

While this insulator is specially intended for use in cooling cars to be filled with fruits, etc., it can be used for any purpose of like character. Being a water proof insulating material, it can be used for all kinds of brine insulation.

I claim:

1. As an article of manufacture, an insulator comprising outer layers of water proof felt, and inner layers of superposed corrugated asbestos and woolen felt, substantially as set forth.

2. As an article of manufacture, an insulator comprising a series of layers consisting of an outer layer of water proof felt, a layer of corrugated asbestos, a layer of heavy woolen felt, another layer of corrugated asbestos, and another outer layer of water proof felt, substantially as set forth.

3. As an article of manufacture, an insulator comprising outer layers of water proof felt, and a plurality of alternate sheets of corrugated asbestos and heavy woolen felt interposed therebetween, substantially as set forth and for the purposes specified.

4. As an article of manufacture, an insulator comprising outer layers of water proof felt, and inner alternate layers of woolen felt, and corrugated asbestos, the corrugations in each alternate layer of asbestos being disposed transversely to the corrugations of the other layers of asbestos, substantially as set forth.

5. As an article of manufacture, an insulator comprising outer layers of water proof felt, and inner layers of superposed corrugated asbestos and woolen felt covered with water proof asphalt compound, substantially as set forth.

6. As an article of manufacture, an insulator comprising outer layers of water proof felt, inner alternate layers of superposed corrugated asbestos and woolen felt, and an adhesive substance adapted to secure said layers together, substantially as set forth.

7. As an article of manufacture, an insulator comprising outer layers of felt saturated with water proof material, inner alternate layers of superposed woolen felt and corrugated asbestos, the corrugations of each alternate layer of asbestos being disposed transversely to the corrugations of the other layers of asbestos, an adhesive mixture adapted to secure said layers together, and a covering therefor of water proof asphalt compound, substantially as set forth and for the purposes specified.

WILLIAM J. MOELLER.

Witnesses:
JAMES N. RAMSEY,
DUDLEY A. DOM.